(12) United States Patent
Yuhara et al.

(10) Patent No.: US 9,650,223 B2
(45) Date of Patent: May 16, 2017

(54) CARRYING APPARATUS AND CARRYING METHOD FOR BATTERY ELECTRODE MEMBER

(75) Inventors: Hiroshi Yuhara, Yokohama (JP); Manabu Yamashita, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 90 days.

(21) Appl. No.: 14/008,223

(22) PCT Filed: Apr. 6, 2012

(86) PCT No.: PCT/JP2012/059506
§ 371 (c)(1),
(2), (4) Date: Oct. 7, 2013

(87) PCT Pub. No.: WO2012/137919
PCT Pub. Date: Oct. 11, 2012

(65) Prior Publication Data
US 2014/0014702 A1    Jan. 16, 2014

(30) Foreign Application Priority Data

Apr. 7, 2011    (JP) .................................. 2011-085725

(51) Int. Cl.
*B65H 20/16*    (2006.01)
*H01M 4/04*    (2006.01)
(Continued)

(52) U.S. Cl.
CPC .............. *B65H 20/16* (2013.01); *H01M 4/04* (2013.01); *H01M 4/139* (2013.01);
(Continued)

(58) Field of Classification Search
USPC .......................................................... 226/88
See application file for complete search history.

(56) References Cited

U.S. PATENT DOCUMENTS 3,622,150 A * 11/1971 Hayes .......................... 271/180
8,105,395 B2    1/2012 Teramoto
(Continued)

FOREIGN PATENT DOCUMENTS

CN    101156261 A    4/2008
CN    101814629 A    8/2010
(Continued)

OTHER PUBLICATIONS

European Extended Search Report, Sep. 17, 2014, 7 pages.

*Primary Examiner* — Sarah A Slifka
*Assistant Examiner* — Haroon S Sheikh
(74) *Attorney, Agent, or Firm* — Foley & Lardner LLP

(57) ABSTRACT

A carrying apparatus carries a battery electrode member (an electrode material film web or an electrode film). The carrying apparatus includes a carrier for holding while curving, and then carrying the electrode member. The carrier is configured to hold the electrode member at a position that doesn't cause a contact with components for another process at a downstream along a carrying direction. Since the electrode member is curved, its stiffness along the carrying direction is strengthened and thereby sagging down is prevented. In addition, the holding position by the carrier is the position that doesn't cause a contact with components for another process at a downstream along a carrying direction. Therefore, according to the carrying apparatus, it is possible to carry the electrode member (an end of an electrode material web or an electrode) to a target position reliably.

10 Claims, 11 Drawing Sheets

(51) Int. Cl.
*H01M 4/139* (2010.01)
*H01M 10/04* (2006.01)

(52) U.S. Cl.
CPC .... *H01M 10/0404* (2013.01); *H01M 10/0413* (2013.01); *Y02P 70/54* (2015.11)

(56) References Cited

U.S. PATENT DOCUMENTS

| | | | |
|---|---|---|---|
| 2009/0038144 A1* | 2/2009 | Teramoto | H01M 4/04 29/623.1 |
| 2010/0132308 A1 | 6/2010 | Kadowaki et al. | |
| 2010/0212817 A1 | 8/2010 | Nagare et al. | |

FOREIGN PATENT DOCUMENTS

| | | |
|---|---|---|
| JP | 61-12695 U | 1/1986 |
| JP | 5-72845 U | 10/1993 |
| JP | 9-320567 A | 12/1997 |
| JP | 11-265703 A | 9/1999 |
| JP | 11-339841 A | 12/1999 |
| JP | 2000-173600 A | 6/2000 |
| JP | 2002-75334 A | 3/2002 |
| JP | 2004-103485 A | 4/2004 |
| JP | 2006-69735 A | 3/2006 |
| JP | 2007-128841 A | 5/2007 |
| JP | 2008-41515 A | 2/2008 |
| WO | WO 2008/139561 A1 | 11/2008 |

* cited by examiner

CARRYING APPARATUS AND CARRYING METHOD FOR BATTERY ELECTRODE MEMBER

The present application is a National Stage of International Application No. PCT/JP2012/059506, filed on Apr. 6, 2012, which claims the benefit of priority to Japanese Patent Application No. 2011-085725, filed on Apr. 7, 2011, the entire contents of all of which are incorporated herein by reference.

TECHNICAL FIELD

The present invention relates to a carrying apparatus and a carrying method for a battery electrode member, especially to a carrying apparatus and a carrying method for a battery electrode member to carry an electrode material film web or an electrode film.

BACKGROUND ART

An electrode (a cathode electrode and an anode electrode) used in a battery has a configuration in which active material layers are formed on both sides of a thin metal film. The electrode is made by being cut out, so as to have a predetermined size, from an electrode material web formed by forming the active material layers on both sides or one side of the thin metal film. In this technique, in order to carry a forward end of the electrode material web to a die, the electrode material is chucked at an upstream from the die and then carried forward (Patent Document 1 listed below). In addition, there is also a technique in which an electrode film is carried by a conveyor (Patent Document 2 listed below).

CITATION LIST

Patent Literature

Patent Literature 1: Japanese Patent Unexamined Publication No. 2007-128841
Patent Literature 2: Japanese Patent Unexamined Publication No. H11-339841

SUMMARY OF INVENTION

In a method disclosed in the above-mentioned Patent Document 1, the electrode material is merely pushed from the upstream. The metal film served as a base member of the electrode material is very thin. Therefore, the forward end of the electrode material may sag down during carrying only by being pushed from the upstream, so that it can't be entered into the die or can't be cut at a regulated position. In addition, also in a case of carrying it to a die by a conveyor as shown in the above-mentioned Patent Document 2, its forward end may sag down when it becomes unsupported from beneath by a surface of a conveyor belt.

An object of the present invention is to provide a carrying apparatus and a carrying method for a battery electrode member that can reliably carry a forward end of an electrode material film web or an electrode film to a desired position when carrying it.

A first aspect of the present invention provides a carrying apparatus for a battery electrode member, comprising: a carrier (carrying means) for holding while curving, and then carrying an electrode material film web or an electrode film, wherein the carrier (carrying means) is configured to hold the electrode material or the electrode at a position that doesn't cause a contact with components for another process at a downstream along a carrying direction.

A second aspect of the present invention provides a carrying method for a battery electrode member a carrying method for a battery electrode member, comprising: holding an electrode material film web or an electrode film, while curving the electrode material or the electrode, by a carrier at a position that doesn't cause components for another process at a downstream along a carrying direction, and carrying.

DESCRIPTION OF EMBODIMENTS

Figure 1:
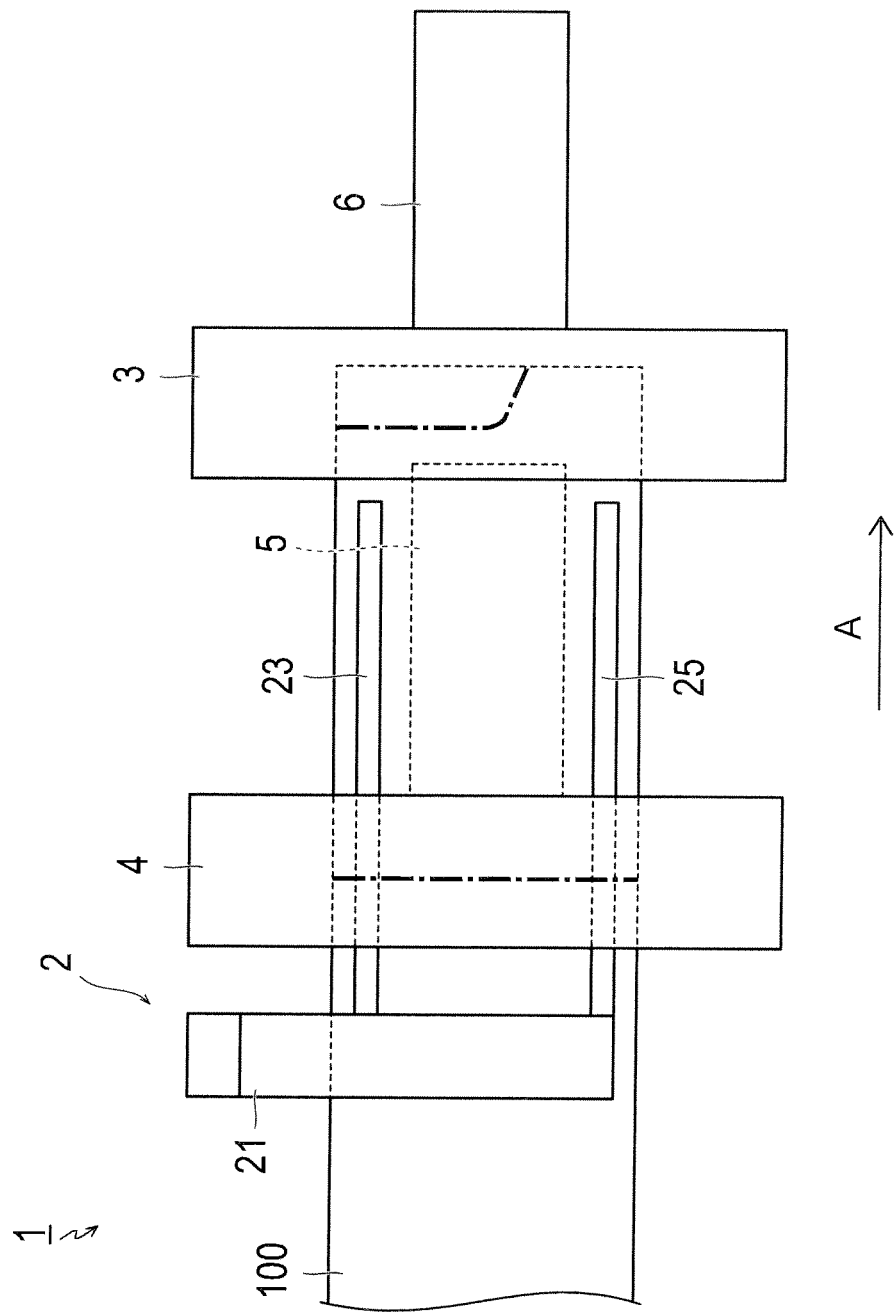
FIG. 1 It is a plan view showing an electrode production device (a carrying apparatus) according to an embodiment.

Hereinafter, an embodiment of a carrying apparatus (carrying method) will be explained with reference to the drawings. Note that equivalent elements are labeled with identical numbers in explanations of the drawings, and their redundant explanations are omitted. In addition, sizes and proportions of components in the drawings are emphasized for convenience of explanations, so that they are different from actual sizes and actual proportions.

Figure 2:
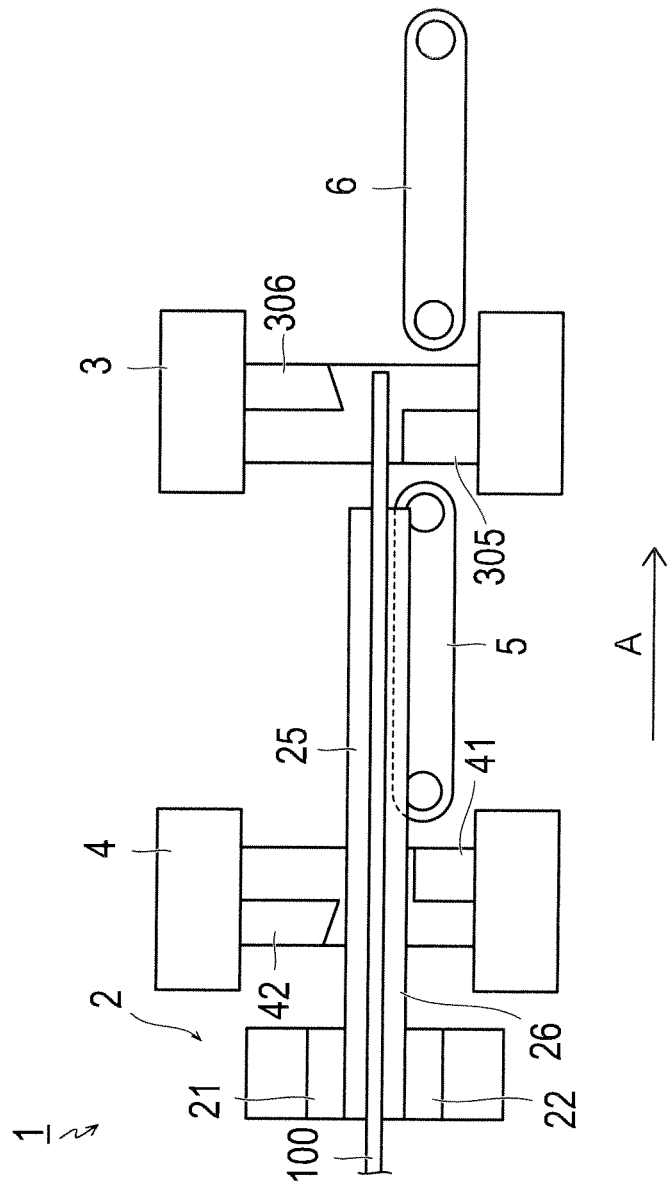
FIG. 2 It is a side view showing the electrode production device.

First, main components of an electrode production device (carrying apparatus) will be explained. As shown in FIG. 1 and FIG. 2, the electrode production device 1 includes a hand (carrier: carrying means) 2, a die 3 for cutting a forward end (hereinafter, referred as a forward end die 3), a die 4 for cutting a rearward end (hereinafter, referred as a rearward end die 4), a first suction conveyor 5, and a second suction conveyor 6.

The hand 2 overhead-carries an electrode material 100 having a film-shape and a web-shape into the forward end die 3. In the present embodiment, the hand 2 holds the electrode material 100 while making it curved along a direction intersecting with a carrying direction A. The forward end die 3 is a forward end cutter, and cuts a forward end of the electrode material 100. The rearward end die 4 is a rearward end cutter, and cuts a rearward end of the electrode material 100. The first suction conveyor 5 is provided at an upstream from the forward end die 3 along the carrying direction A. The first suction conveyor 5 is disposed outside a moving range of the hand 2. A feed surface 5a (see FIG. 3) of the first suction conveyor 5 functions as a support plane that suctions the electrode material 100 and supports it from beneath when the electrode material 100 is cut. In addition, the first suction conveyor 5 feeds out an electrode whose rearward end has been cut to a downstream from the forward end die 3. The second suction conveyor 6 further feeds out the electrode fed out from the first suction conveyor 5 to a downstream therefrom. Note that dashed-dotted lines in FIG. 1 show cutting patterns.

Figure 3:
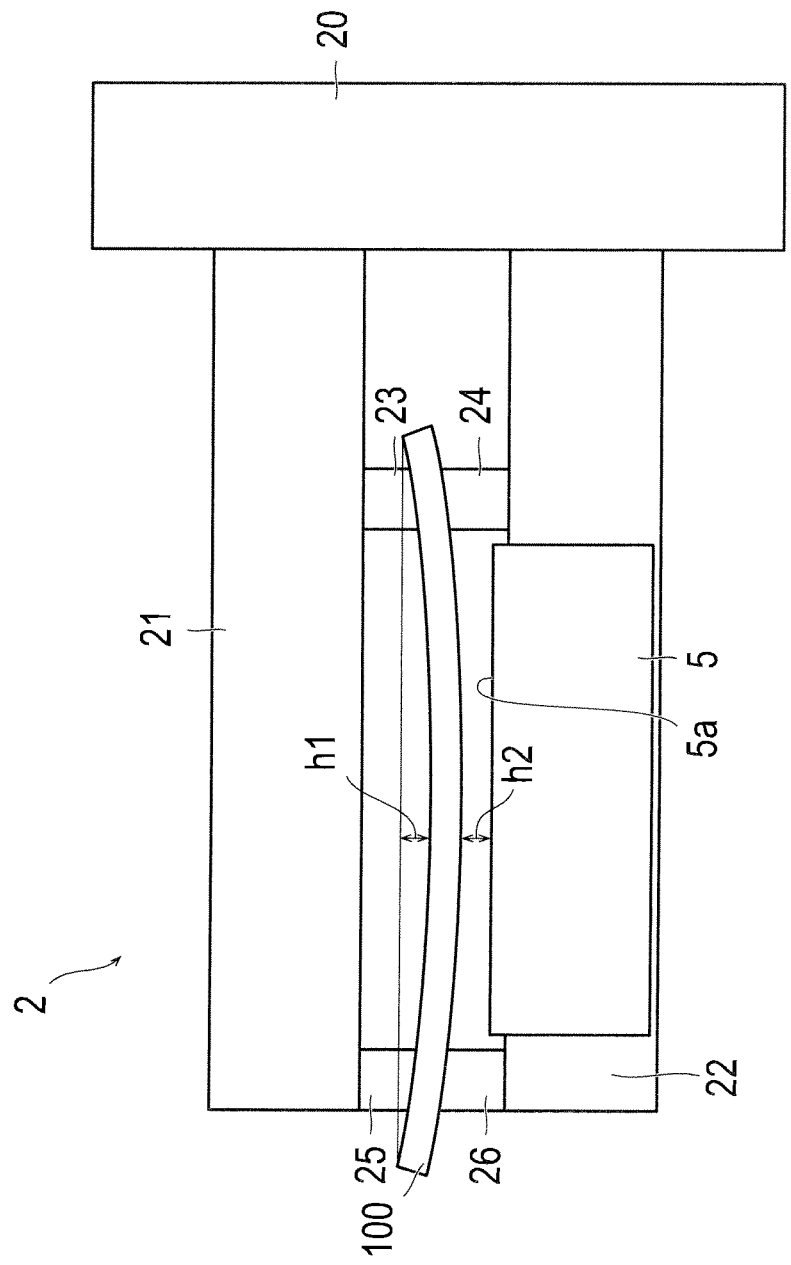
FIG. 3 It is a detail front view showing a hand (carrier) of the electrode production device.

Subsequently, the components of the electrode production device 1 will be explained in detail. FIG. 3 shows the hand 2 and the first suction conveyor 5 viewed from a downstream along the carrying direction A, and the components other than the hand 2 and the first suction conveyor 5 are not shown.

When carrying the electrode material 100 to a cutting position, the hand 2 holds the electrode material 100 at a position where the components of the hand 2 don't contact with the first suction conveyor 5 (details will be explained later). In addition, when carrying the electrode material 100 to the forward end die 3, the hand 2 holds the electrode material 100 at an upstream position from the forward end die 3 (i.e. at a position that doesn't cause a contact with the forward end die 3).

The hand 2 includes a pair of main arms 21 and 22, holding arms (holding portions: holding means) 23 and 25 fixed on the main arm 21, holding arms (holding portions: holding means) 24 and 26 fixed on the main arm 22, and a holding mechanical section 20 that moves an entire of the pair of main arms 21 and 22 and performs a holding action of the holding arms 23 to 26. The holding arms 23 and 25 are attached to the main arm 21 so as to be parallel to the carrying direction A of the electrode material 100, and the holding arms 24 and 26 are attached to the main arm 22 so as to be parallel to the carrying direction A. The holding arms 23 to 26 are attached to the main arms 21 and 22 at laterally outward positions from the first suction conveyor 5. Therefore, the holding arms 23 to 26 can perform their carrying operations without contacting with the first suction conveyor 5. Note that a "lateral direction to the first suction conveyor 5" is a direction perpendicular to the carrying direction A of the first suction conveyor 5 (a moving direction of its belt).

The main arms 21 and 22 move horizontally along the carrying direction A together with holding mechanical section 20. At this time, the holding arms 23 to 26 go through at the laterally outward positions from the first suction conveyor 5. Therefore, the first suction conveyor 5 never enters into a moving range of a horizontal motion of the hand 2 made for its carry-in operation. Namely, the first suction conveyor 5 is disposed outside the moving range of the hand 2. Thus, by a slight upward motion of the hand 2, the electrode material 100 can be separated apart vertically from the first suction conveyor 5 and then carried.

Here, simulated is a case where components of a hand go through just above a first suction conveyor. In this case, while the hand holds an electrode material and carries it into a die, the hand may contact with the first suction conveyor due to its horizontal motion. Therefore, the hand is subject to be moved upward from the first suction conveyor with a large stroke so that it can hold the electrode material at an upstream from the first suction conveyor and then go through above the first suction conveyor. In addition, the hand is inevitably subjected to be moved downward with a large stroke when returned to its initial position. Thus, a vertical stroke of the hand becomes large, so that it takes more time for its stroking operation. On the other hand, in the present embodiment, a vertical stroke of the hand 2 is not needed or extremely small, so that its operation time can be shortened remarkably.

The holding mechanical section 20 vertically moves the entire of the pair of main arms 21 and 22, and controls the holding arms 23 to 26 to hold and release the electrode material 100. The holding mechanical section 20 may be at least a mechanism for performing general operations of a hand.

The holding arms 23 and 25 are attached to the main arm 21, and the holding arms 24 and 26 are attached to the main arm 22. The holding arms 23 and 24 are faced to each other, and the holding arms 25 and 26 are also faced to each other. The holding arms 23 and 24 clip (hold) one side edge of the electrode material 100, and the holding arms 25 and 26 clip (hold) another side edge of the electrode material 100. A hold portion of the holding arms 23 to 26 is located at an upstream from a cutting position of the electrode material 100 along the carrying direction A, and may be at least a position where they can make the electrode material 100 curved by holding the side edges of the electrode material 100.

As shown in FIG. 3, contacting surfaces of the holding arms 23 to 26 with the electrode material 100 are slanted in order to make the electrode material 100 curved along a direction intersecting with the carrying direction A when holding the electrode material 100. Stiffness of the electrode material 100 along the carrying direction A is strengthened by curving the electrode material 100, so that its forward-side portion that is not held does not bow down.

Figure 4:
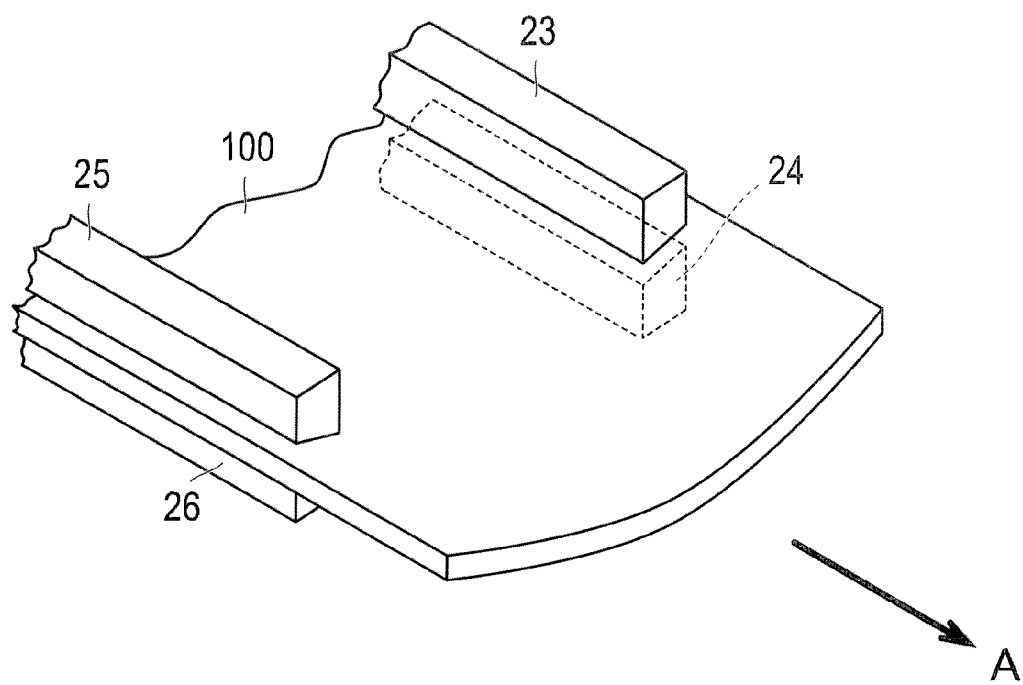
FIG. 4 It is a perspective view showing a curved shape of an electrode material.

As shown in FIG. 4, a center portion of the electrode material 100 is curved into a depressed state (to be convex downward) when the electrode material 100 is held by the holding arms 23 to 26. The stiffness of the electrode material 100 along the carrying direction A is strengthened by curving the center portion into the depressed state in this manner, so that its forward-side portion that is not held does not bow down. In addition, not only the forward-side portion, but other portions outside an area held by the holding arms 23 to 26 also do not sag down.

The curved shape in the depressed state can be formed only by holding and lifting up the both side edges of the electrode material 100. In this case, when holding the both side edges of the electrode material 100 by the hand 2, the hand 2 is slightly lifted up so that the center portion of the electrode material 100 is not contacted with the feed surface 5a of the first suction conveyor 5. It is preferable that an upward stroke length of the hand 2 takes a length by which the center portion of the electrode material 100 is not contacting the first suction conveyor 5 but is made close to it as much as possible. Note that, if the upward stroke length of the hand 2 is long, it takes a long time for stroking the hand 2 vertical and thereby cycle time is subject to be long. In addition, since the forward end of the electrode material 100 is to be inserted between an upper die and a lower die of the forward end die 3 (and the rearward end die 4), the upper die and the lower die are subject to be widely opened when the upward stroke length of the hand 2 is long. In this case, an operation amount of the die becomes large and thereby cycle time is subject to be long. Therefore, it is preferable that the upward stroke length of the hand 2 is as short as possible.

For example, in a case of curving the center portion in the depressed state, an operation amount of the hand 2 can be made small when a curvature amount (a distance from the center portion to a line [incl. a plane] connecting the both side edges) h1 is made almost equivalent to a distance h2 between the center portion and the feed surface 5a as shown in FIG. 3. Specifically, by setting the curvature amount h1 to 0.5 to 2 mm and setting the above distance h2 also to 0.5 to 2 mm, the vertical stroke length of the hand 2 becomes extremely short and a contact of the electrode material 100 with the feed surface 5a can also be prevented. Note that the distance h2 between the center portion and the feed surface 5a is preferably set as explained above, but may be at least a height that prevents the electrode material 100 from contacting with the feed surface 5a.

The curvature amount h1 of the electrode material 100 is enough if it ensures the stiffness that can prevent the forward-side portion from sagging down, but is not needed to be large. Specifically, although depending on a size or a thickness of the electrode material 100, enough stiffness can be ensured by the curvature amount h1=0.5 to 2 mm. The curvature amount h1 is preferably set as explained above, but may be at least an amount that can ensure stiffness for preventing the forward-side portion from sagging down.

Figure 5:
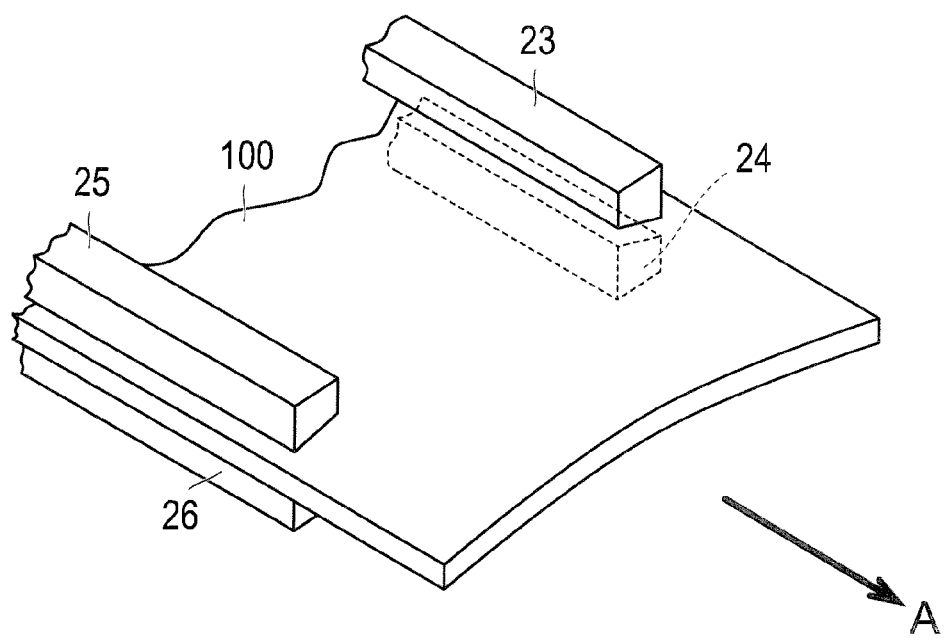
FIG. 5 It is a perspective view showing another curved shape of the electrode material.

FIG. 5 shows another curved shape of the electrode material 100. As shown in FIG. 5, a center portion of the electrode material 100 is curved into an uplifted state (to be convex upward) when the electrode material 100 is held by the holding arms 23 to 26. In this case, contacting surfaces of the holding arms 23 to 26 with the electrode material 100 are slanted inversely to the case shown in FIG. 3 and FIG. 4. By curving the center portion into the uplifted state in this manner, it becomes possible to carry the electrode material 100 without changing a vertical position of the hand 2. A holding position by the holding arms 23 to 26 may be at a height level equivalent to the feed surface 5a of the first suction conveyor 5. Curved in the uplifted state when holding the both side edges, the electrode material 100 can be held above the first suction conveyor 5 even when the holding position is at a height level equivalent to the feed surface 5a and never contacts with the first suction conveyor 5. Therefore, an upward motion of the hand 2 is not needed. Also in this case, a curvature amount is not limited specifically, if it is an amount that can ensure stiffness for preventing the forward-side portion from sagging down depending on a size or a thickness of the electrode material 100.

Here, a curvature direction of the electrode material 100 will be explained. In FIG. 4 and FIG. 5, shown is the difference between the downward convex (FIG. 4) and the upward convex (FIG. 5) of the center portion of the electrode material 100. In the present embodiment, the curvature direction is set to a direction perpendicular to the carrying direction A in any of the cases of the downward convex and the upward convex. Since the both side edges of the electrode material 100 are held by the holding arms 23 to 26, the curvature direction becomes such a direction naturally. However, it is enough to strengthen stiffness along the carrying direction A in order to prevent the forward-side portion from sagging down, so that the curvature direction may be any direction intersecting with the carrying direction A.

Other examples of the curvature direction will be explained with reference to FIG. 6(a) and FIG. 6(b). In the example shown in FIG. 6(a), a position near the forward end is held on one side edge, but a position near the forward end is not held on another side edge. A dashed-two-dotted line approximately indicates the curvature direction formed by the slants of the contacting surfaces of the holding arms 23 to 26 with the electrode material 100. In this case, the holding arms 23 and 24 holding the position near the forward end hold the electrode material 100 at a position that never causes a contact with the forward end die 3.

Figure 6:
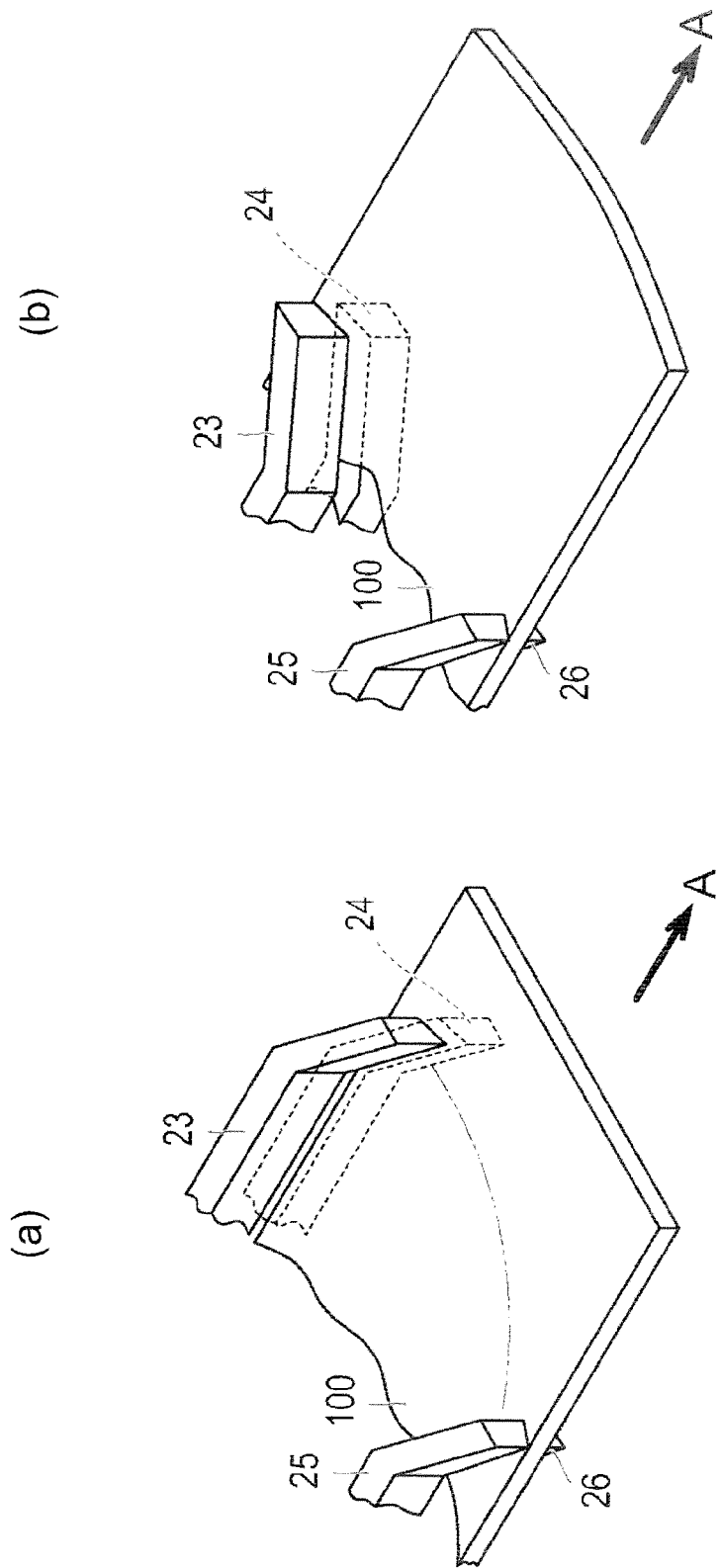
FIGS. 6 (*a*) and (*b*) are perspective views for explaining a curvature direction of the electrode material.

In the example shown in FIG. 6(b), ends of the holding arms 23 and 24 and ends of the holding arms 25 and 26 of the hand 2 are bent outward to be distanced away from each other, and a position near the forward end of the electrode material 100 is not held. According to such a holding manner, the rearward-side portion can be held stronger than the forward-side portion, so that the stiffness along the carrying direction A can be strengthened. In addition, the stiffness is ensured, and the curvature amount near the forward end can be made small. The curved shape of the electrode material 100 may take various shapes. Note that, in FIG. 6(a) and FIG. 6(b), the electrode material 100 is curved into the convex downward state, but may be curved into the convex upward state by changing the slants of the contacting surfaces of the holding arms 23 to 26 with the electrode material 100.

Figure 7:
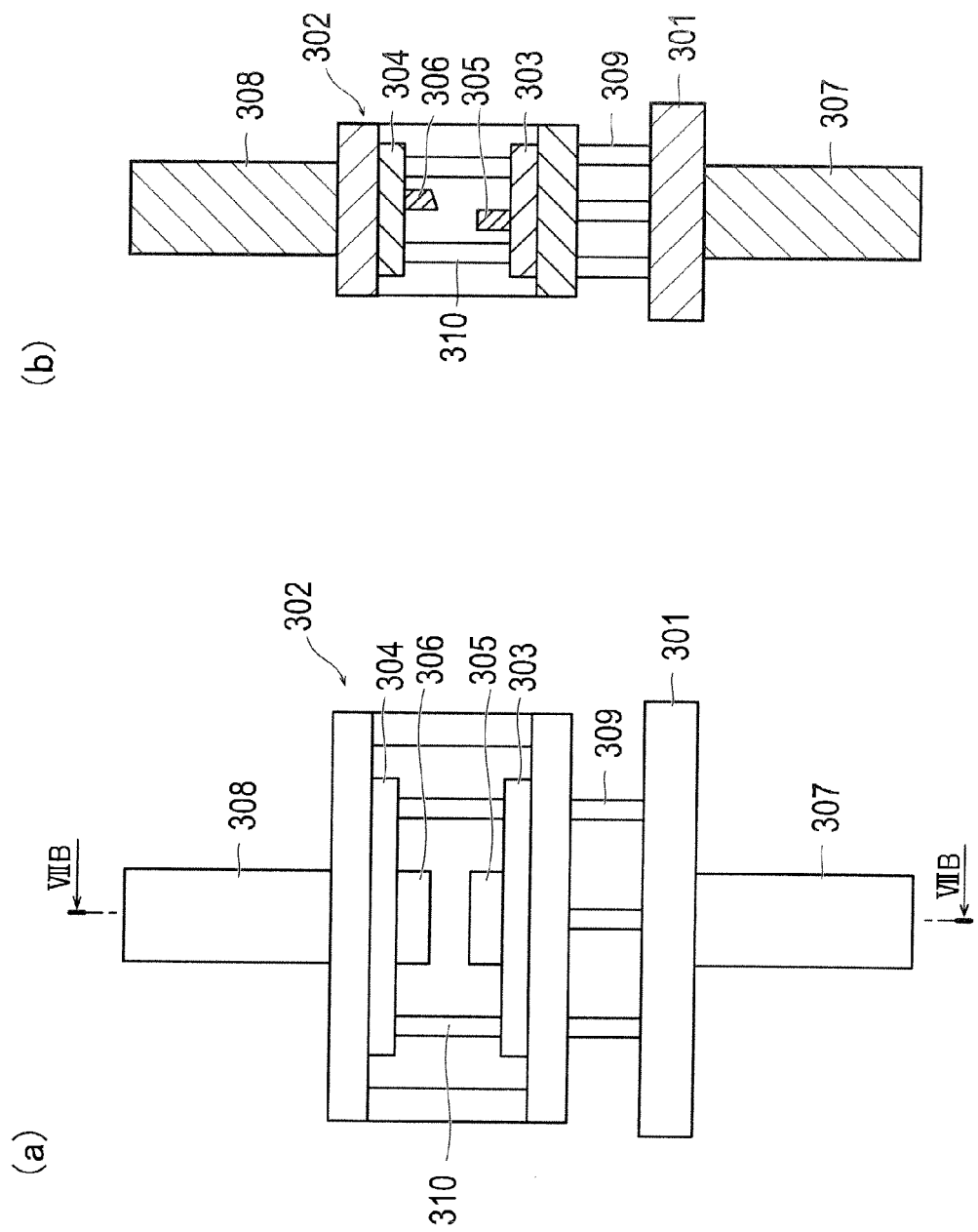
FIG. 7 (*a*) is a front view of a forward end die viewed from a downstream along a carrying-out direction, and (b) is a cross-sectional view taken along a line VIIB-VIIB shown in (a).

As explained above, the forward end die 3 is a die for cutting out an electrode from the electrode material 100 together with the rearward end die 4. The forward end die 3 will be explained with reference to FIG. 7(a) and FIG. 7(b). The forward end die 3 includes a die support base 301, a die frame 302, a lower die base 303, an upper die base 304, a lower die 305, an upper die 306, a frame cylinder 307, an upper die cylinder 308, frame guides 309, and upper die guides 310.

The die support base 301 is attached to an upper end of the frame cylinder 307. The four frame guides 309 are disposed on the die support base 301. The die frame 302 is supported by the frame cylinder 307 and the frame guides 309. An entire of the die frame 302 can be moved vertically along the frame guides 309 by the frame cylinder 307.

The lower We base 303 is fixed at a lower portion within the die frame 302. The lower die 305 is fixed on the lower die base 303. On the other hand, the upper die base 304 is fixed at an upper portion within the die frame 302. The upper die 306 is fixed on the upper die base 304. In addition, four upper die guides 310 whose upper ends and lower ends are fixed to the die frame 302 are provided within the die frame 302.

The upper die base 304 is vertically movable to the upper die guides 310, and moved vertically along the upper die guides 310 by the upper die cylinder 308. A bite position of the upper die 306 and the lower die 305 is regulated by the above-explained internal configuration of the die frame 302. When the upper die base 304 is moved downward within the die frame 302, the upper die 306 bites the electrode material 100 with the lower die 305 to cut it.

Cutting operations of the forward end die 3 will be explained with reference to FIG. 8(a) to FIG. 8(e). In an open state of the die for inserting the electrode material 100 (FIG. 8(a), FIG. 2), the lower die 305 is located at a height level lower than the feed surface 5a (see FIG. 3) of the first suction conveyor 5. In the open state, the electrode material 100 is inserted to a cutting position (the bite position of the upper die 306 and the lower die 305). Subsequently, as shown in FIG. 8(b), the die frame 302 is moved upward by the frame cylinder 307, and then the lower die 305 is stopped at a position where it contacts with the electrode material 100 (at a height level of the feed surface 5a).

Figure 8:
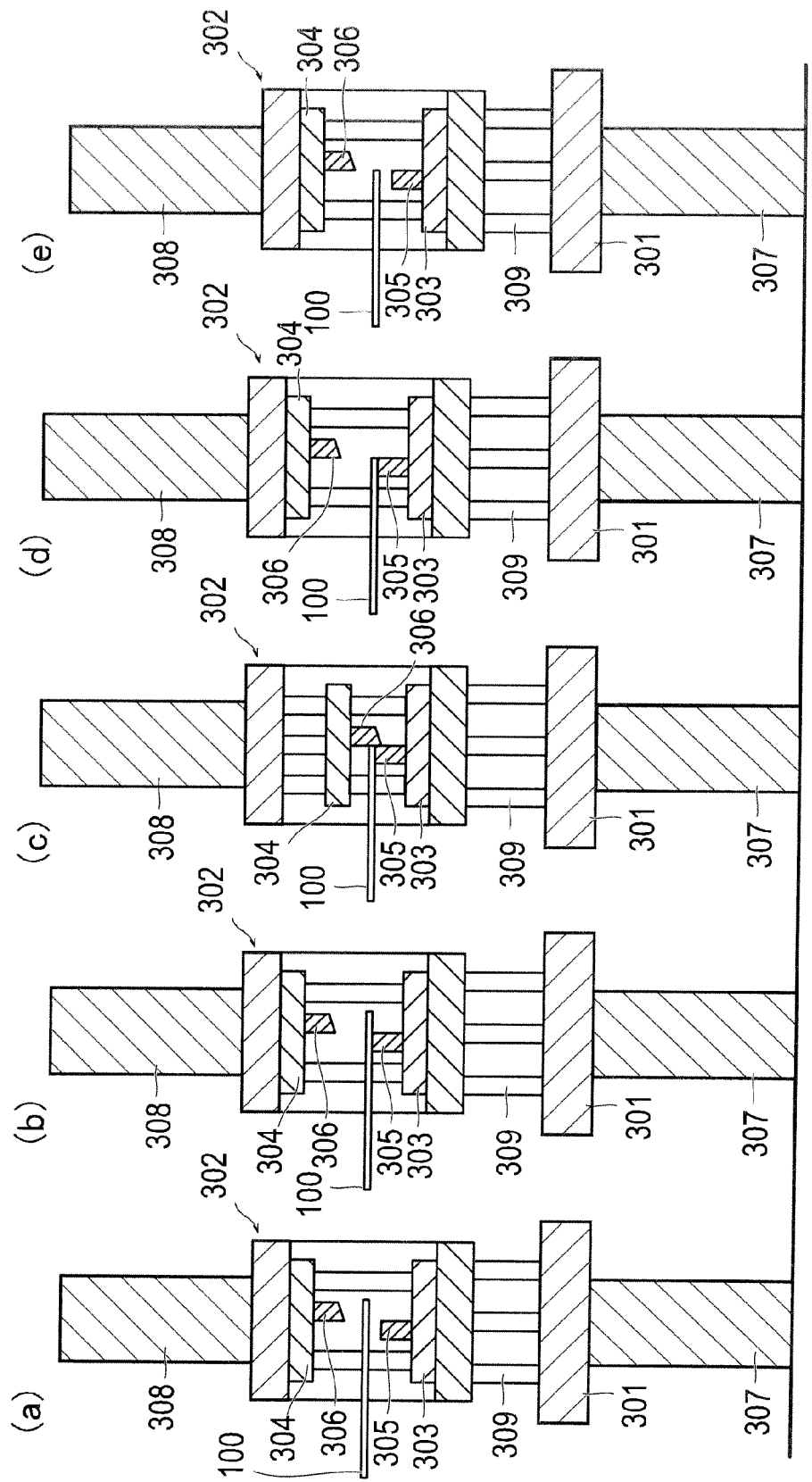
FIG. 8 (*a*) to (*e*) are cross-sectional views showing operations of the forward end die.

Subsequently, as shown in FIG. 8(c), the upper die 306 is moved downward by the upper die cylinder 308, so that the electrode material 100 is cut. Subsequently, as shown in FIG. 8(d), the upper die 306 is moved upward by the upper die cylinder 308, so that it is returned to its initial position. Subsequently, as shown in FIG. 8(e), the die frame 302 is moved downward, so that the entire of the forward end die 3 is returned to its initial position. Note that scraps made after cutting by the forward end die 3 might fall down. Therefore, it is preferable that a slope (not shown) for ejecting the scraps that fall down is provided at a lower-forward position along the carrying direction A from the die support base 301.

As explained above, since the lower die 305 is located at a height level lower than the feed surface 5a of the first suction conveyor 5 in the open state of the forward end die 3, a contact of the electrode material 100 with the lower die 305 is prevented when carrying of the electrode material 100 and the forward end can be easily carried to the cutting position. In addition, if the forward-side portion of the electrode material 100 sags down perchance, the electrode material 100 can be also prevented from being convoluted between the first suction conveyor 5 and the lower die 305, and the forward end can be cut precisely because the forward-side portion is lifted up by the upward motion of the lower die 305 after carrying of the forward-side portion to the cutting position.

Further, since the lower die 305 is located at a height level lower than the feed surface 5a in the open state of the forward end die 3, i.e. returned to the height level after cutting (see FIG. 8(e)), a contact of an electrode that has been cut out with the lower die 305 can be prevented when feeding out the electrode to the second suction conveyor 6. Furthermore, since the entire of the die frame 302 is moved upward when moving the lower die 305 upward, the forward end can be cut precisely by moving the lower die 305 upward while preserving the bite position between the lower die 305 and the upper die 306 regulated by the internal configuration of the die frame 302.

Note that, although the forward end is cut by the downward motion of the upper die 306 made after the upward motion of the lower die 305 in the present embodiment, a start time for the downward motion of the upper die 306 is not limited and determined arbitrarily, for example, based on an upward stroke length of the lower die 305 to the feed surface 5a and a downward stroke length of the upper die 306 while it reaches the electrode material 100 supported at the feed surface 5a. Specifically, when the upward stroke length is longer than the downward stroke length, the upward motion of the lower die 305 (the die frame 302) is started first and then the downward motion of the upper die 306 is started next so that the lower die 305 and the upper die 306 reach the electrode material 100 at the same time. On the contrary, when the upward stroke length is shorter than the downward stroke length, the downward motion of the upper die 306 is started first and then the upward motion of the lower die 305 (the die frame 302) is started next so that the lower die 305 and the upper die 306 reach the electrode material 100 at the same time. By controlling the upper die 306 and the lower die 305 as explained above, cycle time for cutting can be shortened further. Operations of the upper die 306 and the lower die 305 may be optimized in consideration of difference of moving speeds of the upper die 306 and the lower die 305 and so on in addition to the strokes.

The rearward end die 4 has a configuration equivalent to that of the forward end die 3, but their cutting patterns by the dies are different from each other. Cutting operations of the rearward end die 4 will be briefly explained with reference to FIG. 2. First, the holding arms 23 to 26 are moved backward to be evacuated from a space between a lower die 41 and an upper die 42 of the rearward end die 4, so that a rearward end position of the electrode material 100 to be cut is stopped at the space between the lower die 41 and the upper die 42. Then, a rearward end is cut by controlling the lower die 41 and the upper die 42 according to operations equivalent to that of the forward end die 3. Since the rearward end die 4 has a configuration equivalent to that of the forward end die 3, a clearance that allows the holding arms 23 to 26 to go through the space between the lower die 41 and the upper die 42 is ensured. In addition, since the electrode material 100 is carried just above the feed surface 5a, the vertical stroke length of the hand 2 can be made extremely small. Further, since the lower die 41 is located at a height level lower than the feed surface 5a of the first suction conveyor 5 in an open state of the rearward end die 4, a contact of the electrode material web with the lower die 41 is prevented when backward moving of the holding arms 23 to 26 and the forward-side portion whose forward end has been cut can be easily carried to the cutting position.

Note that, even if an enough clearance is ensured between the holding arms 23 to 26 and the lower die 41, the lower die 41 of the rearward end die 4 may be set at a height level equivalent to the feed surface 5a. Since the electrode material 100 is overhead-carried above the feed surface 5a by the hand 2, the electrode material 100 never contacts with the lower die 41 even if the lower die 41 is set at the height level equivalent to the feed surface 5a.

As explained above, the first suction conveyor 5 is disposed between the forward end die 3 and the rearward end die 4 (see FIG. 1 and FIG. 2). In the first suction conveyor 5, suctioning and feeding (driving of its belt) are stopped while the electrode material 100 is carried into the dies by the hand 2. Then, at the same time as, or at a slightly later than a time when the forward end of the electrode material 100 reaches the cutting position during carrying-in of the electrode material 100 by the hand 2, suctioning of the first suction conveyor 5 is started but feeding is not yet started. The electrode material 100 that has been carried-in is held at the cutting position by a suction force of the first suction conveyor 5. After the forward end and the rearward end are cut, feeding thereof is started together with the second suction conveyor 6 to feed out an electrode that has been cut out.

In addition, as explained above, the feed surface 5a of the first suction conveyor 5 is the support plane that supports the electrode material 100 when cutting the electrode material 100. Therefore, the feed surface 5a is made flat to make the suctioned and supported electrode material 100 flat, so that it can be cut sharply.

The second suction conveyor 6 is disposed at a downstream from the forward end die 3 along the carrying direction A (see FIG. 1 and FIG. 2). A feed surface of the second suction conveyor 6 is disposed at a height level lower than the feed surface 5a of the first suction conveyor 5. The electrode that has been cut out is not curved when being fed out from the first suction conveyor 5, and already loses its stiffness along the carrying direction A. Therefore, when feeding out the electrode by the first suction conveyor 5, a forward end of the electrode may sag down. Since the feed surface of the second suction conveyor 6 is disposed at a height level lower than the feed surface 5a of the first suction conveyor 5, the electrode can be laid on the feed surface of the second suction conveyor 6 even when the forward end of the electrode sags down.

In addition, the lower die 305 (in the open state) is disposed at a height level lower than a feed path of the electrode from the first suction conveyor 5 to the second suction conveyor 6. The second suction conveyor 6 is preferably disposed in the same horizontal plane as the lower die 305, or at a height level slightly higher than the lower die 305. The first suction conveyor 5 is disposed at a height level slightly higher than the second suction conveyor 6, and the lower die 305 exists at a height level between the first suction conveyor 5 and the second suction conveyor 6. When the electrode is fed out, the electrode is pushed out slightly downward from the first suction conveyor 5 to the second suction conveyor 6. If the lower die 305 is disposed at a height level higher than the feed path of the electrode from the first suction conveyor 5 to the second suction conveyor 6, the electrode will contact with the lower die 305. Therefore, the lower die 305 is disposed at a height level lower than the feed path of the electrode from the first suction conveyor 5 to the second suction conveyor 6. Note that suctioning and feeding of the second suction conveyor 6 may be performed continuously, or may be started at a time when the forward end of the electrode material 100 is cut.

Figure 9:
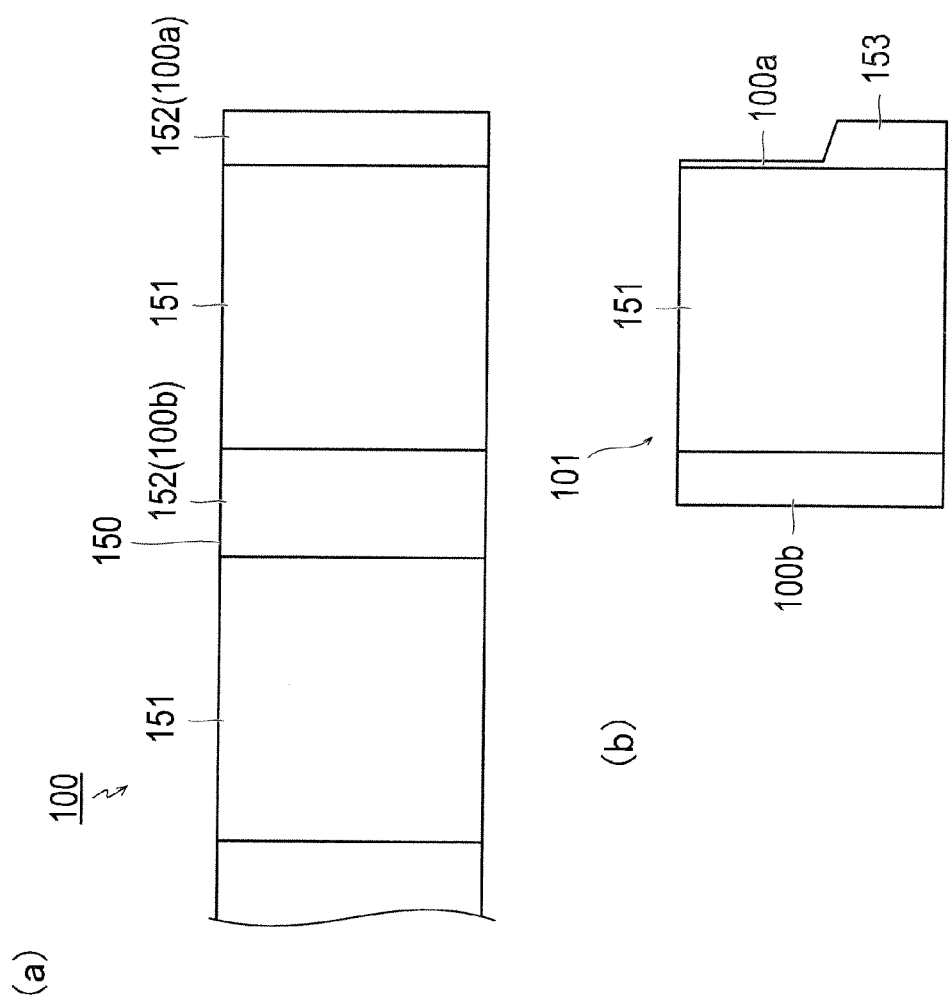
FIG. 9 (*a*) is a plan view of the electrode material before its forward end is cut, and (b) is a plan view of an electrode that has been cut out.

A shape of an electrode that has been cut out will be explained with reference to FIG. 9(a) and FIG. 9(b). As shown in FIG. 9(a), in the electrode material 100, active material layers 151 are formed at constant intervals on both sides of a base member 150 that is a metal film. The active material layer(s) 151 is formed by a cathode active material for a cathode electrode, or formed by an anode active material for an anode electrode. Since the active material layer(s) 151 in the present embodiment is publicly known, detailed explanations for it are omitted.

An area 152, on the forward end 100a of the electrode material 100, where the active material layer 151 is not formed and the metal film is exposed is cut to form a predetermined shape as shown in FIG. 9(b). The forward end 100a that has been cut functions as an electrode tab 153 of a battery. On the other hand, the rearward end 100b of the electrode material 100 is cut straight. Therefore, an electrode 101 having a film shape is cut out to have a shape as shown in FIG. 9(b).

For example, aluminum, nickel, iron, stainless steel, titanium, copper, and so on are used as the base member 150 (the metal film). In addition, a cladding material of nickel and aluminum, and a cladding material of copper and iron, or a plating material by combination of these metals is also used. Further, a conductive polymer film or a film made by adding conductive filler to non-conductive polymer can be used as the base member 150 instead of the metal film. Especially, a film made of a singular metal such as aluminum, stainless steel, and copper is mostly used in view of electron conductivity and battery operating potential. Materials used as the base member 150 for a cathode electrode are different from those for an anode electrode. Thickness of the base member 150 is 1 to 100 μm, for example. The base member 150 becomes a collector after being completed as a battery.

On the other hand, the electrode 101 that has been cut out has an almost B5 to A4 size, if indicated by a paper size, when used as a secondary battery for an electrical vehicle. Therefore, a width of the electrode material 100 is almost a width of a B5 to A4 size and a length thereof is dozens of meters to hundreds of meters, and the electrode material 100 is rolled. The electrode 101 (see FIG. 9(b)) that was cut out in the present embodiment has a shape adapted for a shape of a battery in which it is to be used, but not limited to the shape shown in FIG. 9(b). Note that an electrode is not limited to the electrode 101 in the present embodiment on whose both sides identical electrodes are formed, and may be a bipolar electrode on whose one side a cathode electrode is formed and an anode electrode is formed another side. The electrode 101 that has been cut out is used in a laminated secondary battery, for example. As known well, a cathode electrode, a separator, and an anode electrode are sequentially laminated in a laminated secondary battery.

The electrode material 100 and the electrode 101 that has been cut out are very thin. On the other hand, a secondary battery for a vehicle to which high density and high energy are required has a large area. Therefore, it is hard to keep its shape while carrying it solely horizontally as its portion unsupported by a carrying device (e.g., a conveyor) is easy to sag down. The present embodiment mitigates this problem.

Subsequently, operations of the carrying apparatus will be explained. First, the forward end of the electrode material 100 held by the hand 2 is carried to the cutting position of the forward end die 3. Since the components of the hand 2 go through laterally outside the first suction conveyor 5 at this time, it takes very little time to move the hand 2 vertically. In addition, the electrode material 100 is overhead-carried while its stiffness along the carrying direction A is strengthened. Therefore, the forward end of the electrode material 100 is carried to the cutting position without a contact of the electrode material 100 with components other than the hand 2 and the first suction conveyor 5. This state is shown in FIG. 1 and FIG. 2.

When the forward end of the electrode material 100 reaches the cutting position of the forward end die 3, the first suction conveyor 5 starts suctioning but does not start feeding. When position-setting for cutting is completed, the hand 2 releases the electrode material 100 and then moves backward at the same time as suctioning is started. Almost in parallel with these operations (or before the start of suctioning even if the forward end has reached the cutting position), the die frame 302 is moved upward in order to contact the lower die 305 with the forward end of the electrode material 100. The holding arms 23 to 26 do not contact with the forward end die 3 even when the hand 2 is moved to its most downstream position. Therefore, the upward motion of the die frame 302 can be started even if the forward end has reached the cutting position. Namely, the die can be driven before the hand 2 is moved backward, so that cycle time can be shortened.

Figure 10:
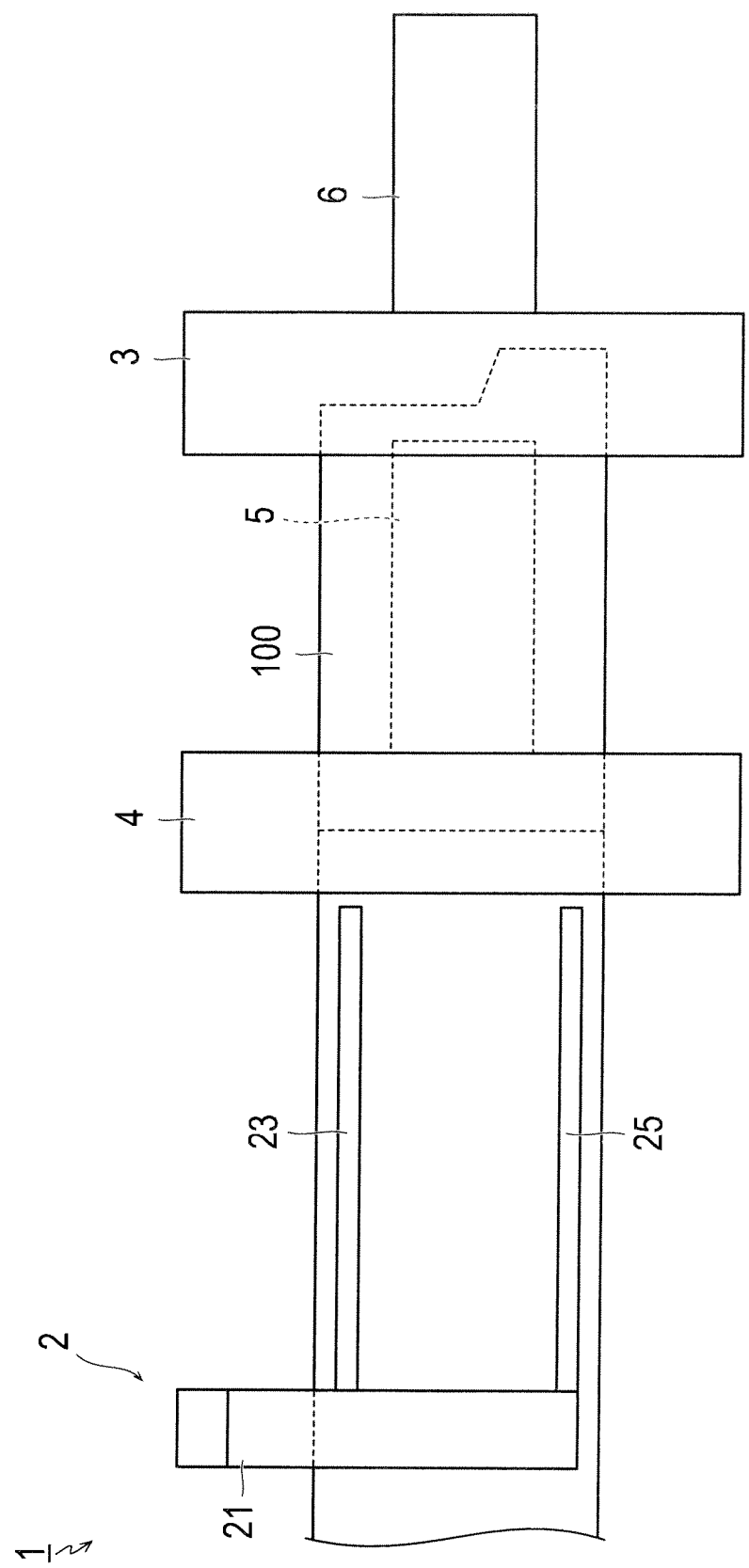
FIG. 10 It is a plan view showing the electrode production device when the hand is moved backward.
Figure 11:
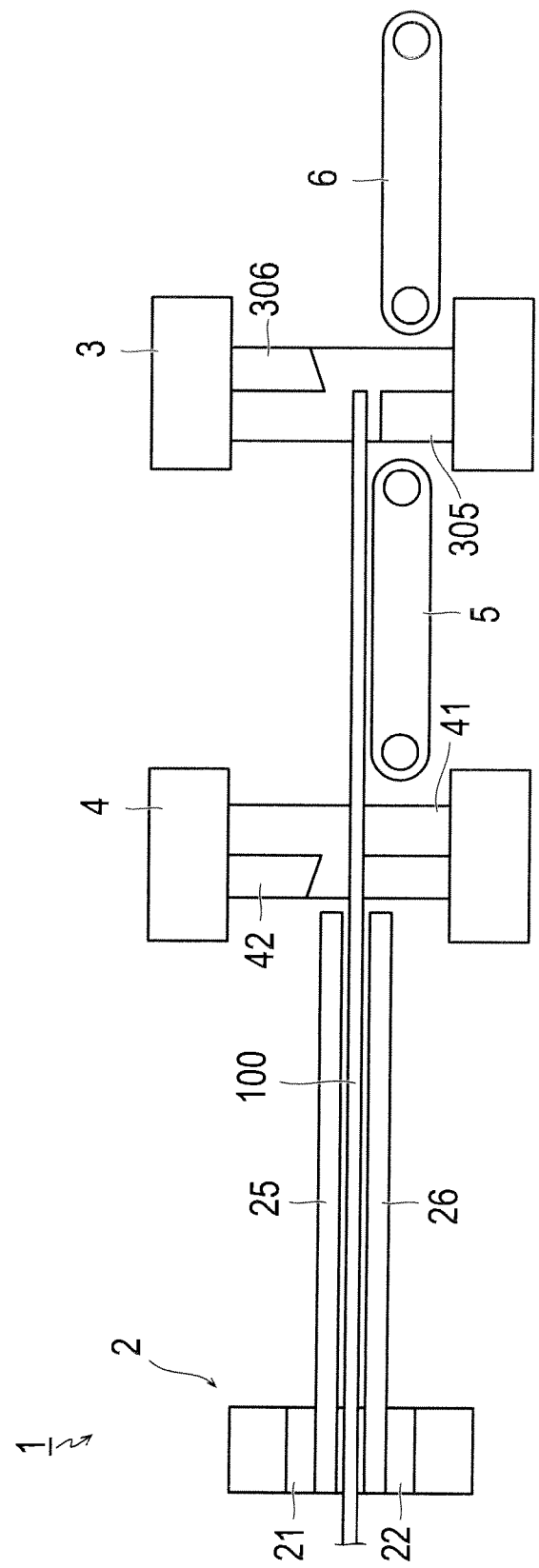
FIG. 11 It is a side view showing the electrode production device when the hand is moved backward.

Then, the electrode material 100 is cut by the forward end die 3, and the hand 2 is moved backward, while the forward end is being cut, to its initial position at which it has been laid before it held the electrode material 100. This state is shown in FIG. 10 and FIG. 11. In addition, the forward end die 3 is also returned to a lower position after cutting is completed. After the hand 2 is moved backward, the rearward end of the electrode material 100 is cut by the rearward end die 4. When cutting by the rearward end die 4 is completed, the first suction conveyor 5 starts feeding in order to feed out the electrode 101 that has been cut out to the second suction conveyor 6. The second suction conveyor 6 receives the electrode 101, and then further it feeds out to a subsequent process. Therefore, the electrode 101 that has been cut out never contacts with components other than the first suction conveyor 5 and the second suction conveyor 6.

According to the present embodiment, the electrode material 100 is held by the hand 2 while it is made curved along the direction intersecting with the carrying direction A. The holding position is a position where the components of the hand 2 don't contact with the forward end die 3 (components for a process [cutting process] other than the carrying process) at a downstream along the carrying direction A. Therefore, when the hand 2 holds only a rearward-side portion of the electrode material 100 so as not to contact with the forward end die 3, the forward-side portion (and an intermediate portion that is not held) of the electrode material 100 never sags down. Thus, the electrode material 100 can be carried reliably to the forward end die 3 as a carrying target position (i.e., into the cutting position).

In addition, since the electrode material 100 can be carried reliably to the forward end die 3 without sagging down, its position aberration at a time of cutting by the die can be prevented. Further, since the holding position by the hand 2 is an upstream position that never causes a contact with the forward end die 3, cutting operations by the forward end die 3 can be started before the hand 2 is moved backward (i.e., at the same time as the electrode material 100 is carried into the forward end die 3).

In addition, since the hand 2 holds the both side edges of the electrode material 100, it is easy to make the electrode material 100 curved. Further, the electrode material 100 can be easily curved to be convex downward by gravity only by slightly lifting up the held both side edges held by the hand 2. Note that it is not needed to lift up the hand 2 in a case where the electrode material 100 is curved to be convex upward. In addition, by curving the electrode material 100 to be convex upward and setting the holding position by the hand 2 in the same plane as the first suction conveyor 5, the electrode material 100 can be easily laid on the first suction conveyor 5 only by releasing holding of the hand 2.

Further, the components (the holding arms 23 to 26) of the hand 2 are disposed at the laterally outward positions from the first suction conveyor 5 so as not to contact the first suction conveyor 5. Thus, the first suction conveyor 5 never enters into the moving range of the hand 2. Therefore, the hand 2 can overhead-carry the electrode material 100 above the first suction conveyor 5 only by its slight lift-up operation. Thus, cycle time can be shortened even when the hand 2 and the first suction conveyor 5 are located on the same side.

In addition, since the electrode material 100 is overhead-carried by the hand 2 to the cutting position of the forward end die 3, it never contacts with components other than the hand 2, especially with the die (the forward end die 3 or the rearward end die 4). Therefore, the formed active material layers 151 can be prevented from being damaged due to contacts of the electrode material 100 with the other components, so that reduction of its thickness, its electrical capacity and its lifetime, which may be caused by the damage, can be also prevented. Note that, since the electrode 101, which has been cut out, is also fed out by the first suction conveyor 5 and the second suction conveyor 6, a contact with the components other than first suction conveyor 5 and the second suction conveyor 6 can be prevented even after cutting out.

Further, when the electrode material 100 is carried in by the hand, the first suction conveyor 5 performs only suctioning but doesn't perform feeding. Therefore, the electrode material 100 is suctioned to be fixed at the cutting position, so that its position aberration at a time of cutting (driving the die) is prevented. As a result, the electrode 101 having a regulated shape can be reliably cut out from the electrode material 100.

In addition, the feed surface of the second suction conveyor 6 is disposed at a height level lower than the feed surface 5a of the first suction conveyor 5. Therefore, the electrode 101 that has been cut out can be reliably feed out from the first suction conveyor 5 to the second suction conveyor 6.

In addition, the lower die 305 of the forward end die 3 is disposed at a height level lower than the feed surface 5a of the first suction conveyor 5, and moved upward after the electrode material 100 has been carried into the forward end die 3. Therefore, the forward end of the electrode material 100 can be easily entered to the cutting position of the forward end die 3, and the forward end die 3 is prevented from contacting, before cutting, with the electrode material 100 to prevent the active material layers 151 from being damaged. Further, if perchance the forward-side portion of the electrode material 100 sags down, it is lifted up by the lower die 305 and thereby the electrode material 100 can be cut at its regulated cut position. In addition, since the rearward end die 4 is provided in addition to the forward end die 3, the forward end and the rearward end of the electrode material 100 can be cut so as to have different shapes from each other.

An electrode for a battery manufactured according to the present embodiment is suitable for a cathode electrode or an anode electrode used in a secondary battery for driving a motor installed on a vehicle. Here, such a vehicle is an automobile that drives road wheels by at least one motor or another type of vehicle (e.g. a train), for example. An electric vehicle that doesn't use gasoline or a hybrid electric vehicle is exemplified as such an automobile. Especially, since high power characteristic and high energetic characteristic are required for a secondary battery for driving a motor installed on a vehicle, an electrode is desired to have a large area (e.g. an area equivalent to a B5 to A4 size as explained above). Since an electrode for such a secondary battery is very thin in its thickness and has a large area, it is difficult to handle it. According to the present embodiment, a large electrode for a battery can be manufactured favorably, as explained above.

Although the invention has been described above by reference to certain embodiments of the invention, the invention is not limited to the embodiments described above. The scope of the present invention is determined in the context of the claims.

Figure 12:
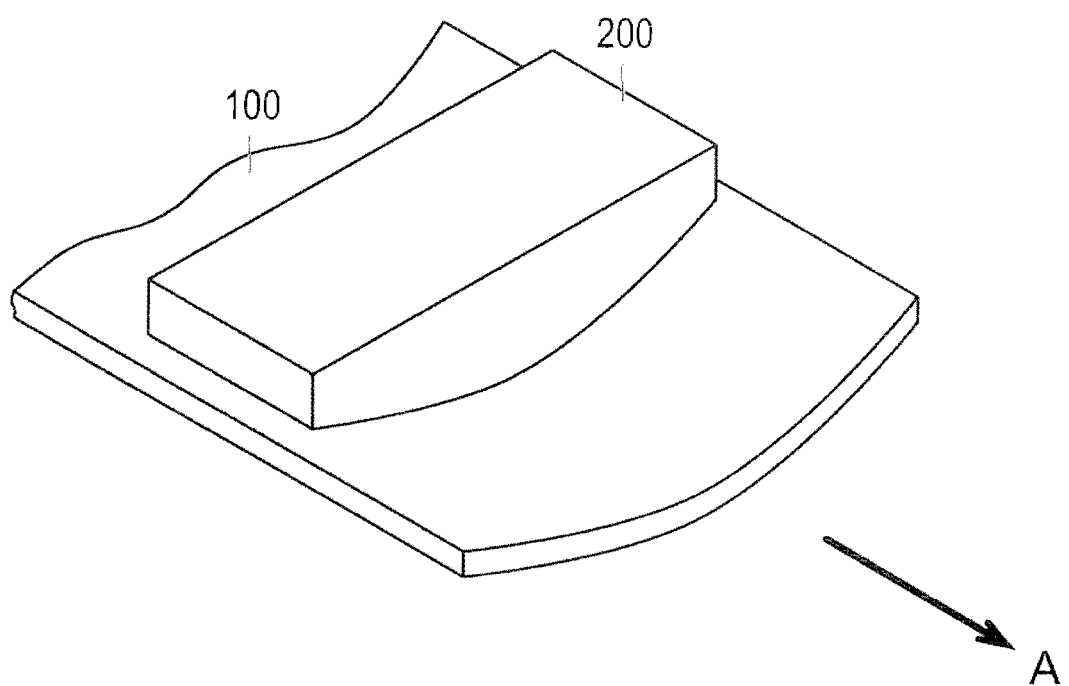
FIG. 12 It is a perspective view showing an example in which a suction pad is used as the carrier.

For example, as shown in FIG. 12, a suction pad 200 may be used as the carrier. In this case, the suction pad 200 suctions the electrode material 100 from above to hold it. Therefore, the first suction conveyor 5 never contacts with the suction pad 200. In addition, a suction surface of the suction pad 200 is formed as a curved surface that is curved along a direction intersecting with the carrying direction A. Therefore, the electrode material 100 is made curved and carried while its stiffness along the carrying direction A is strengthened.

Also in this case, similar to the above embodiment, the first suction conveyor 5 is disposed outside the moving range of the suction pad 200. Therefore, it takes very little time to move the suction pad 200 vertically and thereby cycle time can be shortened. In addition, the electrode material 100 is carried without contacting components other than the suction pad 200. Further, even if a suctioning position by the suction pad 200 is an upstream position that never causes a contact with the forward end die 3, cutting operations of the forward end die 3 can be started before evacuating the suction pad 200 (i.e., at the same time as the electrode material 100 is entered into the forward end die 3).

In addition, the present invention is applied to carrying of the electrode material 100 in the above embodiment, but can be applied to carrying of the electrode 101 that has been cut out. Although the electrode 101 is fed out by the second suction conveyor 6 in the above embodiment, a carrier such as the hand 2 or the suction pad 200 can be used for carrying out the electrode 101 to a subsequent process (or, to a further subsequent process after the second suction conveyor 6). According to this, the electrode 101 can be reliably carried out to the subsequent process without sagging down a forward-side portion and an intermediate portion of the electrode 101.

Further, the forward end and the rearward end of the electrode 101 have different shapes from each other in the above embodiment, but may have an identical shape to each other. In a case where the forward end and the rearward end of the electrode 101 are cut to have an identical shape to each other, cutting can be done only by the forward end die 3 (the rearward end die 4 is not needed). In a case where cutting is done by only the forward end die 3, the rearward end is cut after further carrying, from the cutting position of the forward end by the forward end die 3, the electrode material 100 by a length equivalent to one electrode. Also in this case, similar to the above embodiment, the carrier (the hand 2, the suction pad 200 or the like) holds the electrode material 100 at an upstream position from the forward end die 3 (i.e. at a position that does not cause a contact with the forward end die 3) to strengthen the stiffness along the carrying direction A. Therefore, it is possible to carry the electrode material 100 to the cutting position without contacting the electrode material 100 with components other than the carrier and to start the cutting operations of the forward end die 3 at the same time as it has been carried to the cutting position.

In addition, since the electrode 101 is cut out toward an downstream from the forward end die 3 in a case where cutting is done by only the forward end die 3, it is not needed to feed the electrode material 100 at an upstream from the forward end die 3 and thereby the first suction conveyor 5 is not needed. However, also in this case, it is preferable to suction the electrode material 100 that has been carried-in by the carrier (the hand 2, the suction pad 200 or the like) by providing a suction device (suctioning means) at an upstream from the forward end die 3 to support the electrode material 100 from beneath. The electrode 101 can be cut out reliably and sharply by suctioning the electrode material 100 at an upstream from the forward end die 3. A suction pad may be used as the suctioning device (suctioning means), for example. The suction pad is disposed so that its flat suction surface functions as a support plane, and, when the electrode material 100 carried by the carrier has reached to the cutting position, the suctioning device (suctioning means) starts suctioning at the same time as the carrier releases the electrode material 100.

In addition, the forward end cutter (forward end die 3) and the rearward end cutter (rearward end die 4) are not limited to a die, but may be a laser cutter, for example. In a case of applying a laser cutter, a vertically movable support member (a pin support, a honeycomb support or the like) is disposed at a position of the lower die 305 of the forward end die 3, and the electrode material 100 is cut by irradiating a laser light from above. If perchance the forward-side portion of the electrode material 100 sags down, it is lifted up by the support member and thereby the electrode material 100 can be laser-cut at its regulated cut position.

In the above embodiment, only the upper die 306 moves in relation to the die frame 302 of the forward end die 3. However, the upper die and the lower die may be provided independently from each other, even if a bite of the upper die and the lower die can be made at a regulated cutting position when cutting. Namely, it is possible that only the lower die 305 is independently moved upward when the forward end of the electrode material 100 reaches the cutting position, and then the upper die 306 is independently moved downward. This is much the same for the rearward end die 4.

The horizontal motion of the carrier (hand 2) is made only along the carrying direction A in the above embodiment. However, the hand 2 may be configured to be moved laterally after releasing the electrode material 100 to be returned to its initial position, and its operable direction(s) can be changed arbitrarily.

The invention claimed is:

1. A carrying apparatus configured to carry an electrode material having a film-shape or a web-shape or an electrode having a film-shape for a battery, the apparatus comprising:
   a carrier structured to hold the electrode material or the electrode while curving the electrode material or the electrode along a direction intersecting with a carrying direction, and then carry the electrode material or the electrode,
   wherein the carrier is formed as a hand that includes holding arms that hold side edges of the electrode material or the electrode parallel to the carrying direction, and holds the electrode material or the electrode by the holding arms at an upstream portion from a leading edge of the electrode material or the electrode along the carrying direction,
   wherein the holding arms are configured to insert the electrode material or the electrode between an upper die and a lower die of a first cutting die in a cantilever manner such that the leading edge is free when the electrode material or the electrode is disposed between the upper die and the lower die, and the electrode material or the electrode is cut by the upper die and lower die with the leading edge being free,
   wherein the carrying apparatus further comprises a suction conveyor that is disposed between the first cutting die and a second cutting die provided upstream from the first cutting die along the carrying direction, and is configured to suction the electrode material or the electrode while cutting the electrode material or the electrode by the first cutting die and the second cutting die, and then feed the electrode material or the electrode cut by the first cutting die and the second cutting die downstream along the carrying direction, and
   wherein the first cutting die and the second cutting die have different cutting patterns from each other.

2. The carrying apparatus according to claim 1, wherein the curved electrode material or the curved electrode is shaped convex downward in relation to a horizontal plane.

3. The carrying apparatus according to claim 1, wherein the curved electrode material or the curved electrode is shaped convex upward in relation to a horizontal plane.

4. The carrying apparatus according to claim 3, wherein further comprising:
   the suction conveyor is disposed below a carrying path of the electrode material or the electrode, and
   the holding arms are configured to hold the side edges of the electrode material or the electrode in a same plane as a feed surface of the suction conveyor.

5. The carrying apparatus according to claim 1, wherein the holding arms are configured to hold the electrode material or the electrode in the cantilever manner such that a downstream end area of the electrode material or the electrode, from a held position at which the holding arms hold the electrode material or the electrode to the leading edge, is not supported from beneath, and then insert the downstream end area between the upper die and the lower die.

6. A carrying method for a battery electrode member carrying an electrode material having a film-shape and a web-shape or an electrode having a film-shape for a battery, the method comprising:
holding, by a carrier, the electrode material or the electrode, while curving the electrode material or the electrode along a direction intersecting with a carrying direction, and
carrying the electrode material or the electrode,
wherein the carrier is formed as a hand that includes holding arms that hold side edges of the electrode material or the electrode parallel to the carrying direction, and holds the electrode material or the electrode by the holding arms at an upstream portion from a leading edge of the electrode material or the electrode along the carrying direction,
wherein the holding arms are configured to insert the electrode material or the electrode between an upper die and a lower die of a first cutting die in a cantilever manner such that the leading edge is free when the electrode material or the electrode is disposed between the upper die and the lower die, and the electrode material or the electrode is cut by the upper die and lower die with the leading edge being free,
wherein a suction conveyor is disposed between the first cutting die and a second cutting die provided upstream from the first cutting die along the carrying direction, and is configured to suction the electrode material or the electrode while cutting the electrode material or the electrode by the first cutting die and the second cutting die, and then feed the electrode material or the electrode cut by the first cutting die and the second cutting die downstream along the carrying direction, and
wherein the first cutting die and the second cutting die have different cutting patterns from each other.

7. The carrying method according to claim 6, wherein the curved electrode material or the curved electrode is shaped convex downward in relation to a horizontal plane.

8. The carrying method according to claim 6, wherein the curved electrode material or the curved electrode is shaped convex upward in relation to a horizontal plane.

9. The carrying method according to claim 8, wherein the suction conveyor is disposed below a carrying path of the electrode material or the electrode, and
the holding arms are configured to hold the side edges of the electrode material or the electrode in a same plane as a feed surface of the suction conveyor.

10. The carrying method according to claim 6, wherein the holding arms are configured to hold the electrode material or the electrode in the cantilever manner such that a downstream end area of the electrode material or the electrode, from a held position at which the holding arms hold the electrode material or the electrode to the leading edge, is not supported from beneath, and then insert the downstream end area between the upper die and the lower die.

* * * * *